United States Patent
Subramaniyan et al.

(10) Patent No.: US 10,151,325 B2
(45) Date of Patent: Dec. 11, 2018

(54) GAS TURBINE DIFFUSER STRUT INCLUDING A TRAILING EDGE FLAP AND METHODS OF ASSEMBLING THE SAME

(71) Applicant: General Electric Company, Schenectady, NY (US)

(72) Inventors: Moorthi Subramaniyan, Bangalore (IN); Manjunath Bangalore Chengappa, Bangalore (IN); Pradeep Patel, Bangalore (IN)

(73) Assignee: General Electric Company, Schenectady, NY (US)

(*) Notice: Subject to any disclaimer, the term of this patent is extended or adjusted under 35 U.S.C. 154(b) by 364 days.

(21) Appl. No.: 14/681,441

(22) Filed: Apr. 8, 2015

(65) Prior Publication Data
US 2016/0298646 A1 Oct. 13, 2016

(51) Int. Cl.
*F01D 25/24* (2006.01)
*F01D 25/30* (2006.01)
(Continued)

(52) U.S. Cl.
CPC ............ *F04D 29/542* (2013.01); *B23P 19/00* (2013.01); *F01D 5/145* (2013.01); *F01D 9/045* (2013.01); *F01D 25/28* (2013.01); *F01D 25/30* (2013.01); *F04D 29/544* (2013.01); *F04D 29/681* (2013.01); *B64C 23/06* (2013.01); *F01D 25/162* (2013.01); *F01D 25/24* (2013.01); *F05D 2240/122* (2013.01); *F05D 2240/123* (2013.01); *F05D 2240/127* (2013.01)

(58) Field of Classification Search
CPC .... F04D 29/542; F04D 29/544; F01D 17/143; F01D 17/16; F01D 9/045; F01D 5/145; F01D 5/162; F01D 5/24; F01D 5/30; B64C 2003/143; B64C 23/06; Y02T 50/12
See application file for complete search history.

(56) References Cited

U.S. PATENT DOCUMENTS 1,893,064 A * 1/1933 Zaparka .................... B64C 3/14
244/198
2,034,218 A * 3/1936 Weick ..................... B64C 9/146
244/212
(Continued)

FOREIGN PATENT DOCUMENTS

EP    1 112 928 A2    7/2001
EP    1 780 378 A2    5/2007
(Continued)

OTHER PUBLICATIONS

Extended European Search Report and Opinion issued in connection with corresponding EP Application No. 16163830.9 dated Aug. 5, 2016.

*Primary Examiner* — Todd E Manahan
*Assistant Examiner* — Eric Linderman
(74) *Attorney, Agent, or Firm* — Armstrong Teasdale LLP (57) ABSTRACT

A gas turbine diffuser for use with a gas turbine power system is provided. The diffuser includes an annular inner wall and an annular outer wall circumscribing the inner wall such that a gas path is defined between the inner and outer walls. The diffuser further includes a plurality of circumferentially-spaced struts extending from the inner wall to the outer wall across the gas path. At least one of the struts has a flap.

20 Claims, 5 Drawing Sheets

(51) Int. Cl.
  *F01D 9/04*   (2006.01)
  *F04D 29/54*  (2006.01)
  *F01D 5/14*   (2006.01)
  *F04D 29/68*  (2006.01)
  *B23P 19/00*  (2006.01)
  *F01D 25/28*  (2006.01)
  *B64C 23/06*  (2006.01)
  *F01D 25/16*  (2006.01)

(56) References Cited

U.S. PATENT DOCUMENTS

| | | | |
|---|---|---|---|
| 2,257,215 A * | 9/1941 | Zap | B64C 13/00 244/215 |
| 2,866,313 A | 12/1958 | Holl | |
| 2,875,579 A * | 3/1959 | Gerdan | F02C 7/20 60/726 |
| 3,704,075 A * | 11/1972 | Karstensen | F01D 9/041 415/131 |
| 4,298,089 A * | 11/1981 | Birch | F02K 1/386 181/213 |
| 4,542,868 A * | 9/1985 | Boyd | B64C 3/14 244/198 |
| 4,901,527 A * | 2/1990 | Nash | F23R 3/20 60/749 |
| 5,058,837 A * | 10/1991 | Wheeler | B64C 23/06 244/198 |
| 5,076,516 A * | 12/1991 | Wheat | B64C 3/14 244/154 |
| 5,272,869 A * | 12/1993 | Dawson | F01D 9/042 415/142 |
| 5,294,080 A * | 3/1994 | Ross | B64C 9/14 244/215 |
| 5,492,448 A * | 2/1996 | Perry | B64C 3/14 416/228 |
| 5,518,210 A * | 5/1996 | Friberg | B64C 3/50 244/198 |
| 5,734,990 A * | 4/1998 | Waring | A41D 7/00 2/10 |
| 5,851,105 A * | 12/1998 | Fric | F01D 25/162 415/208.1 |
| 6,045,325 A * | 4/2000 | Horvath | F01D 5/148 277/637 |
| 6,131,853 A * | 10/2000 | Bauer | B64C 23/00 114/284 |
| 6,467,422 B1 * | 10/2002 | Elms | B63B 1/248 114/274 |
| 6,488,238 B1 * | 12/2002 | Battisti | B64C 21/025 244/204 |
| 6,565,045 B1 * | 5/2003 | Correge | B64C 3/14 244/212 |
| 6,843,452 B1 * | 1/2005 | Vassberg | B64C 3/50 244/203 |
| 7,028,954 B2 * | 4/2006 | Van Dam | B64C 3/44 244/204 |
| 7,070,144 B1 * | 7/2006 | DiCocco | B64C 5/12 244/204.1 |
| 7,114,911 B2 * | 10/2006 | Martin | F04D 29/563 415/1 |
| 7,200,933 B2 * | 4/2007 | Lundgren | B23P 15/04 29/889.2 |
| 7,410,133 B2 * | 8/2008 | Lee | B64C 9/18 244/130 |
| 7,565,796 B2 * | 7/2009 | Eleftheriou | F01D 25/162 415/9 |
| 7,614,150 B2 * | 11/2009 | Lundgren | B23K 26/24 29/596 |
| 7,624,941 B1 * | 12/2009 | Patel | B62D 35/007 244/200.1 |
| 7,673,461 B2 * | 3/2010 | Cameriano | F01D 5/147 415/142 |
| 7,740,205 B1 * | 6/2010 | Nahas | B64C 9/20 244/198 |
| 7,740,206 B2 | 6/2010 | Eaton et al. | |
| 7,914,259 B2 | 3/2011 | Godsk | |
| 8,157,528 B1 * | 4/2012 | Khozikov | B64C 23/065 416/146 R |
| 8,182,232 B2 * | 5/2012 | Slot | F03D 1/0641 416/223 R |
| 8,231,142 B2 * | 7/2012 | Olver | F16L 23/167 285/13 |
| 8,267,654 B2 * | 9/2012 | van Dam | F03D 7/022 416/14 |
| 8,402,769 B2 * | 3/2013 | Maltson | F01D 9/041 415/191 |
| 8,662,854 B1 * | 3/2014 | Salaverry | F03D 1/0675 415/907 |
| 8,695,926 B2 * | 4/2014 | Brewer | B64C 3/50 244/215 |
| 8,757,557 B2 * | 6/2014 | Brewer | B64C 3/58 244/17.13 |
| 8,770,649 B2 * | 7/2014 | Praskovsky | B62D 35/001 296/180.1 |
| 8,925,869 B2 * | 1/2015 | Friedel | B64C 9/16 244/113 |
| 8,979,484 B2 * | 3/2015 | Eleftheriou | F01D 25/24 415/144 |
| 8,985,503 B2 * | 3/2015 | Desroche | B64C 23/06 244/17.11 |
| 9,039,381 B2 * | 5/2015 | Grife | F03D 1/0675 416/236 R |
| 9,267,491 B2 * | 2/2016 | Vossler | F03D 7/0252 |
| 9,303,621 B2 * | 4/2016 | Fuglsang | F03D 1/0641 |
| 9,315,264 B2 * | 4/2016 | Zhu | B64C 11/18 |
| 9,494,053 B2 * | 11/2016 | Orosa | F01D 17/143 |
| 9,574,544 B2 * | 2/2017 | Tobin | F03D 1/0675 |
| 9,631,517 B2 * | 4/2017 | Liles | F01D 25/162 |
| 9,677,580 B2 * | 6/2017 | Barrett | F15D 1/004 |
| 9,909,434 B2 * | 3/2018 | Tsifourdaris | F01D 9/04 |
| 9,988,931 B2 * | 6/2018 | Shteyman | F01D 25/04 |
| 2003/0218102 A1 * | 11/2003 | Van Dam | B64C 3/44 244/215 |
| 2004/0088989 A1 * | 5/2004 | Dowman | F01D 17/162 60/772 |
| 2004/0253096 A1 * | 12/2004 | Legg | F01D 9/04 415/191 |
| 2005/0109013 A1 * | 5/2005 | Eleftheriou | F01D 5/22 60/226.1 |
| 2005/0163963 A1 * | 7/2005 | Munro | B63B 1/36 428/90 |
| 2006/0042223 A1 * | 3/2006 | Walker | F01D 9/065 60/39.08 |
| 2008/0121301 A1 * | 5/2008 | Norris | F01D 25/30 138/39 |
| 2008/0317587 A1 * | 12/2008 | Lord | F01D 5/146 415/160 |
| 2009/0321582 A1 * | 12/2009 | Eaton | B64C 23/06 244/215 |
| 2010/0158697 A1 * | 6/2010 | Kim | F03D 3/005 416/243 |
| 2010/0181433 A1 * | 7/2010 | Catino | B64C 21/025 244/208 |
| 2010/0275614 A1 * | 11/2010 | Fontaine | F01D 25/162 60/797 |
| 2010/0329838 A1 * | 12/2010 | Greenblatt | B64C 23/005 415/1 |
| 2011/0008174 A1 * | 1/2011 | Ireland | B64C 23/06 416/223 R |
| 2011/0056179 A1 * | 3/2011 | Orosa | F01D 25/30 60/39.5 |
| 2011/0073745 A1 * | 3/2011 | Duchatelle | F01D 9/04 248/637 |
| 2011/0210211 A1 * | 9/2011 | Zha | B64C 21/025 244/208 |
| 2011/0214433 A1 * | 9/2011 | Feindel | F01D 25/162 60/796 |
| 2011/0223033 A1 * | 9/2011 | Wang | F03D 1/0608 416/235 |

(56) References Cited

U.S. PATENT DOCUMENTS

| | | | | |
|---|---|---|---|---|
| 2011/0272532 A1* | 11/2011 | Matsuda | ............ | B64C 9/10 244/215 |
| 2011/0302929 A1* | 12/2011 | Bruhwiler | ............ | F01D 9/044 60/796 |
| 2012/0141269 A1* | 6/2012 | Giguere | ............ | F03D 1/0633 416/1 |
| 2012/0145066 A1* | 6/2012 | King | ............ | B63G 8/08 114/333 |
| 2012/0204569 A1* | 8/2012 | Schubert | ............ | F02C 7/20 60/772 |
| 2012/0285172 A1* | 11/2012 | Poyyapakkam | ............ | F23R 3/14 60/737 |
| 2012/0324863 A1* | 12/2012 | Winkler | ............ | F23R 3/20 60/39.463 |
| 2013/0091865 A1* | 4/2013 | Nanda | ............ | F01D 9/065 60/805 |
| 2013/0152592 A1* | 6/2013 | Orosa | ............ | F01D 25/305 60/772 |
| 2013/0228655 A1* | 9/2013 | Burgunder | ............ | B64C 1/061 244/214 |
| 2014/0003922 A1* | 1/2014 | Daniels | ............ | F01D 25/24 415/182.1 |
| 2014/0060062 A1 | 3/2014 | Subbareddyar et al. | | |
| 2014/0064955 A1* | 3/2014 | Senter | ............ | F01D 9/042 415/209.3 |
| 2014/0096500 A1* | 4/2014 | Chengappa | ............ | F01D 5/145 60/39.5 |
| 2014/0109588 A1* | 4/2014 | Ciani | ............ | F23R 3/286 60/776 |
| 2014/0137533 A1 | 5/2014 | Subramaniyan et al. | | |
| 2014/0255184 A1* | 9/2014 | Sutton | ............ | F01D 7/00 416/1 |
| 2014/0373556 A1* | 12/2014 | Aronsson | ............ | F01D 25/162 60/796 |
| 2015/0086339 A1* | 3/2015 | Orosa | ............ | F01D 17/143 415/148 |
| 2015/0198116 A1* | 7/2015 | Lovett | ............ | F02K 1/1269 239/11 |
| 2015/0361819 A1* | 12/2015 | Epstein | ............ | F01D 9/041 415/1 |
| 2016/0146468 A1* | 5/2016 | Gao | ............ | F23R 3/20 60/742 |
| 2016/0298849 A1* | 10/2016 | Yang | ............ | F23R 3/286 |
| 2017/0089584 A1* | 3/2017 | Poyyapakkam | ............ | F23R 3/286 |
| 2017/0137116 A1* | 5/2017 | Ireland | ............ | B64C 23/06 |
| 2018/0100653 A1* | 4/2018 | Wood | ............ | F23R 3/36 |

FOREIGN PATENT DOCUMENTS

| | | |
|---|---|---|
| EP | 2514668 A1 | 10/2012 |
| EP | 2514669 A1 | 10/2012 |
| JP | 2004-100615 A | 4/2004 |
| WO | 02/38442 A2 | 5/2002 |

\* cited by examiner

GAS TURBINE DIFFUSER STRUT INCLUDING A TRAILING EDGE FLAP AND METHODS OF ASSEMBLING THE SAME

BACKGROUND

The field of this disclosure relates generally to gas turbines and, more particularly, to gas turbine diffusers.

At least some known gas turbines include a compressor, a combustor, and a turbine. Ambient air flows into the compressor and is compressed. Compressed air is then discharged into the combustor wherein the compressed air is mixed with fuel and ignited to generate combustion gases. The combustion gases are channeled from the combustor through the turbine, thereby driving the turbine which, in turn, may power an electrical generator coupled to the turbine.

A diffuser is often coupled downstream from the turbine to facilitate recovering static pressure and increasing the operating efficiency of the gas turbine. However, at least some known diffusers include support struts that extend across a flow path of the diffuser. Such support struts at least partially obstruct and may disrupt gas flow through the diffuser. For example, when the gas turbine is operating in partial load conditions, combustion gases discharged from the turbine may flow over the support struts at a greater angle of incidence (i.e., the combustion gases may be discharged from the turbine with a greater swirling action) than may occur when the gas turbine is operating during base load conditions. The increased swirling may cause the flow of combustion gases over the struts to separate, thus reducing the static pressure recovery capability of the diffuser. It would be useful, therefore, to provide a diffuser that facilitates causing less flow separation over the struts when the gas turbine is operating in partial load conditions.

BRIEF DESCRIPTION

In one aspect, a gas turbine diffuser for use with a gas turbine power system is provided. The diffuser includes an annular inner wall and an annular outer wall circumscribing the inner wall such that a gas path is defined between the inner and outer walls. The diffuser further includes a plurality of circumferentially-spaced struts extending from the inner wall to the outer wall across the gas path. At least one of the struts has a flap.

In another aspect, a gas turbine is provided. The gas turbine includes a combustor, a turbine arranged in flow communication with the combustor, and a diffuser arranged in flow communication with the turbine. The diffuser includes an annular inner wall and an annular outer wall circumscribing the inner wall such that a gas path is defined between the inner and outer walls. The diffuser further includes a plurality of circumferentially-spaced struts extending from the inner wall to the outer wall across the gas path. At least one of the struts has a flap.

In another aspect, a method of assembling a gas turbine diffuser is provided. The method includes providing an annular inner wall and an annular outer wall that circumscribes the inner wall such that a gas path is defined between the inner and outer walls. The method also includes coupling a plurality of circumferentially-spaced struts between the inner and outer walls such that the struts extend from the inner wall to the outer wall across the gas path. The method further includes coupling a flap to at least one of the struts.

DETAILED DESCRIPTION

The following detailed description illustrates a gas turbine diffuser and methods of assembling the same by way of example and not by way of limitation. The description should enable one of ordinary skill in the art to make and use the diffuser, and the description describes several embodiments of the diffuser, including what is presently believed to be the best modes of making and using the diffuser. The diffuser is described herein as being coupled within a gas turbine power system. However, it is contemplated that the diffuser has general application to a broad range of systems in a variety of fields other than gas turbine systems.

Figure 1:
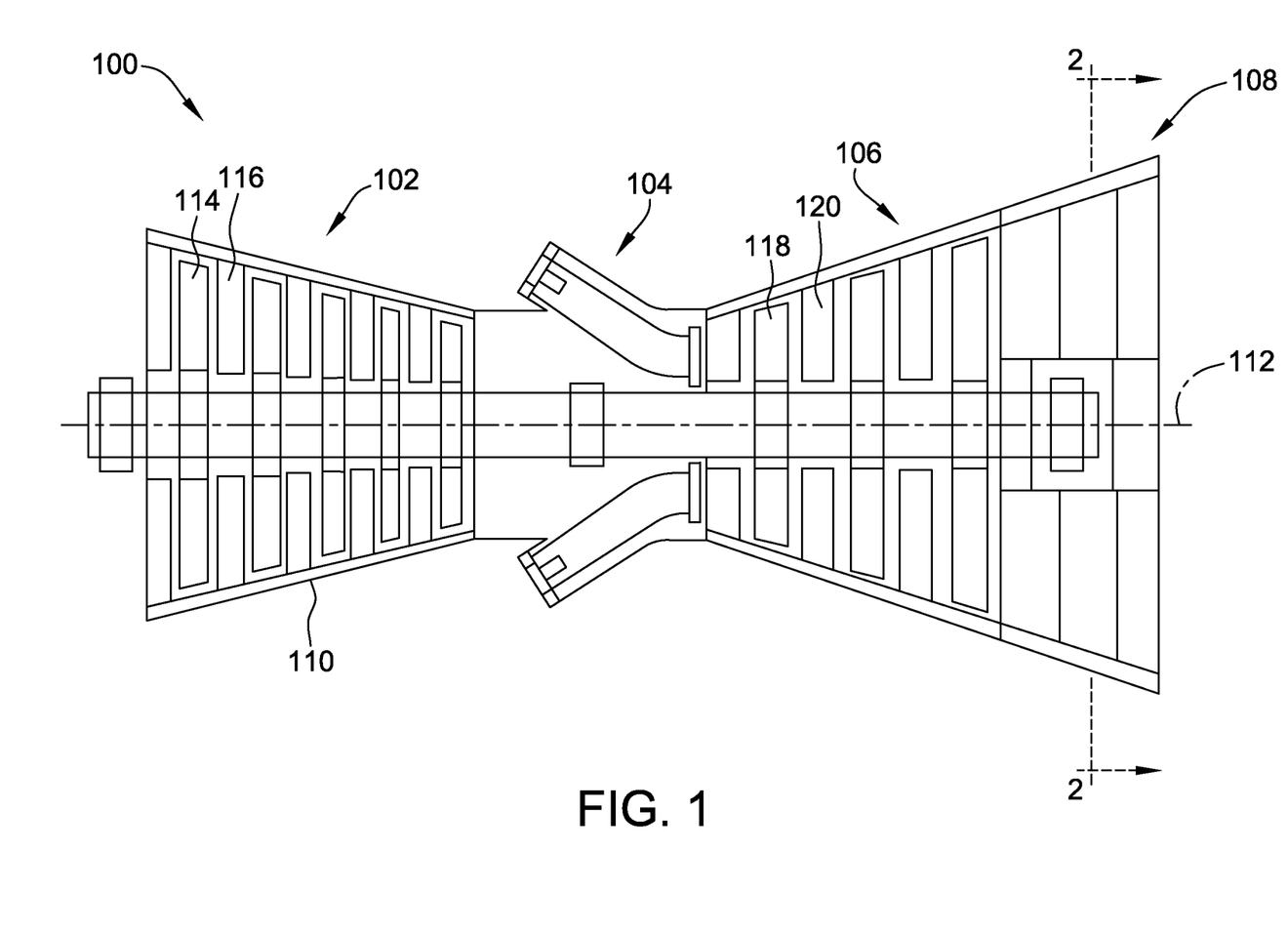
FIG. 1 is a schematic view of an exemplary gas turbine.

FIG. 1 illustrates an exemplary gas turbine 100. In the exemplary embodiment, gas turbine 100 has a compressor 102, a combustor 104, a turbine 106, and a diffuser 108 coupled in flow communication with one another within a casing 110 and spaced along a centerline axis 112. Compressor 102 includes a plurality of rotor blades 114 and a plurality of stator vanes 116. Similarly, turbine 106 includes a plurality of rotor blades 118 and a plurality of stator vanes 120. In operation, air flows into compressor 102 and is compressed and channeled into combustor 104. The compressed air is mixed with fuel and ignited in combustor 104 to generate a flow of combustion gases that is channeled into turbine 106. The combustion gases drive rotor blades 118 of turbine 106 which, in turn, in the exemplary embodiment, drive an electrical generator (not shown) coupled to rotor blades 118 of turbine 106. The combustion gases are then discharged from turbine 106 into diffuser 108 before being exhausted into a heat recovery steam generator (HRSG) (not shown) or to the ambient. As used herein, the term "air" refers to any gas or combination of gases that are suitable for use as a working fluid in a gas turbine, and is not limited to the particular combination of Earth's atmospheric gases commonly referred to as "air."

Figure 2:
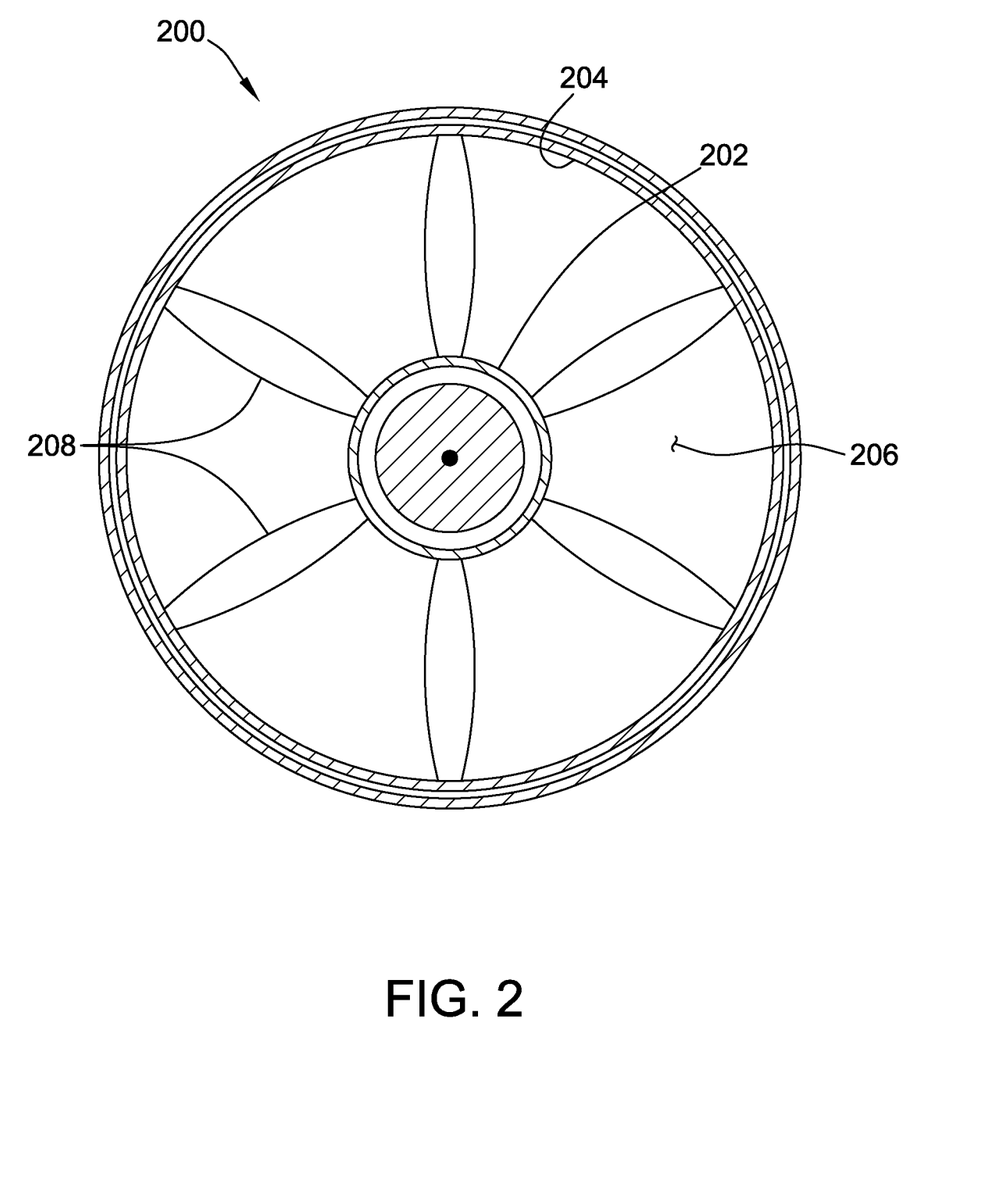
FIG. 2 is a sectional view of an exemplary diffuser that may be used with the gas turbine shown in FIG. 1 taken along plane 2-2 of FIG. 1.

FIG. 2 illustrates a sectional view of an exemplary diffuser 200 that may be used in gas turbine 100 (shown in FIG. 1). In the exemplary embodiment, diffuser 200 has an annular inner wall 202 and an annular outer wall 204 that circumscribes inner wall 202, wherein outer wall 204 is spaced a distance from inner wall 202 such that a portion of a gas path 206 is defined therebetween. In the exemplary embodiment, diffuser 200 includes a plurality of circumferentially-spaced struts 208 that extend generally radially outward from inner wall 202 to outer wall 204 and across gas path 206. Although five struts 208 are illustrated in the exemplary embodiment, in other embodiments, diffuser 200 may include any number of struts 208 that enables diffuser 200 to function as described herein.

During operation of gas turbine 100, combustion gases discharged from turbine 106 are channeled through diffuser gas path 206 such that the combustion gases flow past struts 208. However, because struts 208 are static (i.e., non-moving) structures, the smoothness of the gas flow over struts 208 depends at least in part upon the swirl angle of the combustion gases discharged from turbine 106. As used herein, the gas flow over struts 208 is "smooth" if the gas flow experiences substantially no flow separation over struts 208. For example, if gas turbine 100 is operating at base load (i.e., at about 100% of rated load), the swirl angle of combustion gases discharged from turbine 106 may be lower than if gas turbine 100 is operated at partial load (i.e., at less than 100% of rated load). As such, the combustion gases tend to be discharged from turbine 106 in a more axial direction when gas turbine 100 is operating at base load as compared to combustion gases discharged from turbine 106 when gas turbine 100 is operated at partial load.

In one example, if gas turbine 100 is operating at about 100% of rated load, combustion gases may be discharged from turbine 106 at an angle of incidence of about 5° relative to struts 208. By comparison, for example, combustion gases may be discharged from turbine 106 at an angle of incidence of about 45° relative to struts 208 when gas turbine 100 is operating at about 40% of rated load. Because of the increased swirling action, the combustion gases tend to flow less smoothly past struts 208 when gas turbine 100 is operating at partial load. For example, flow separation of the combustion gases over struts 208 tends to occur more frequently during partial load conditions, and thus tends to disrupt the flow of combustion gases through diffuser 200 by causing vortices or wakes to form downstream from struts 208. Such disruptions in the combustion gas flow through gas path 206 of diffuser 200 can adversely limit the static pressure recovery capability of diffuser 200, which can in turn detract from the overall operating efficiency of gas turbine 100.

Figures 3, 4:
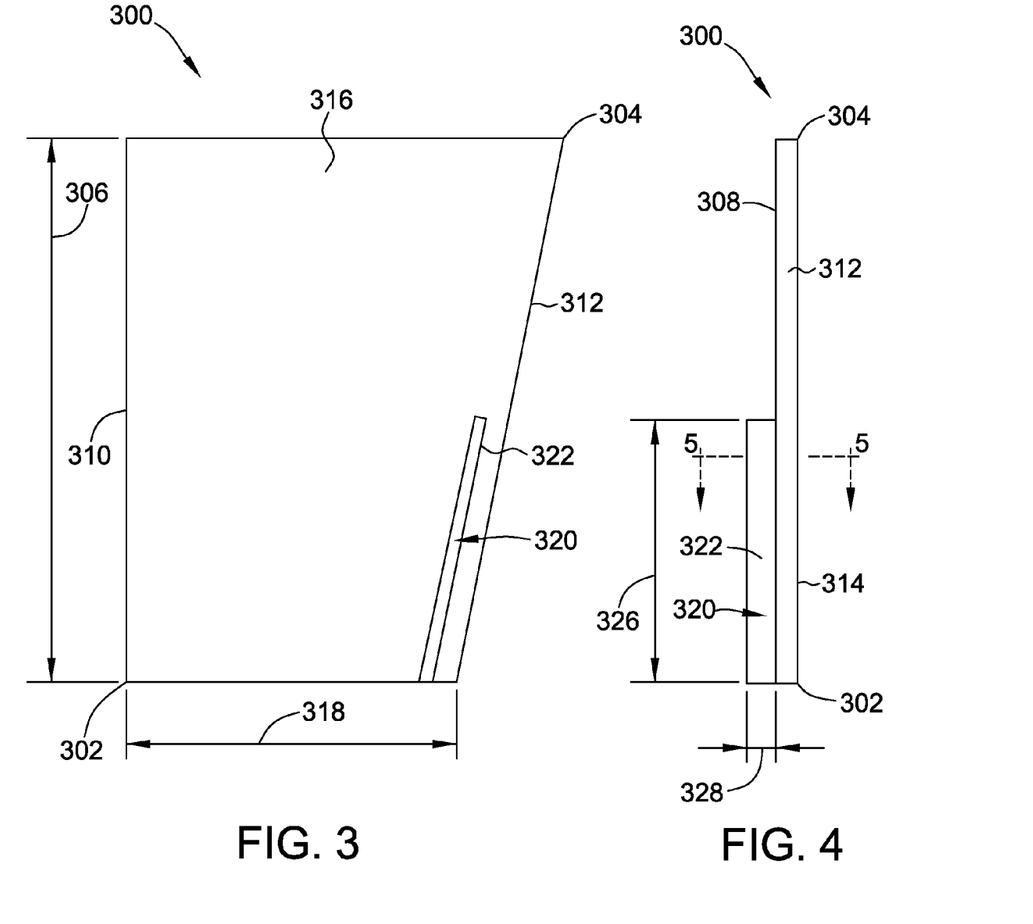
FIG. 3 is side view of an exemplary strut for use in the diffuser shown in FIG. 2.
FIG. 4 is a rear view of the strut shown in FIG. 3.
Figure 5:
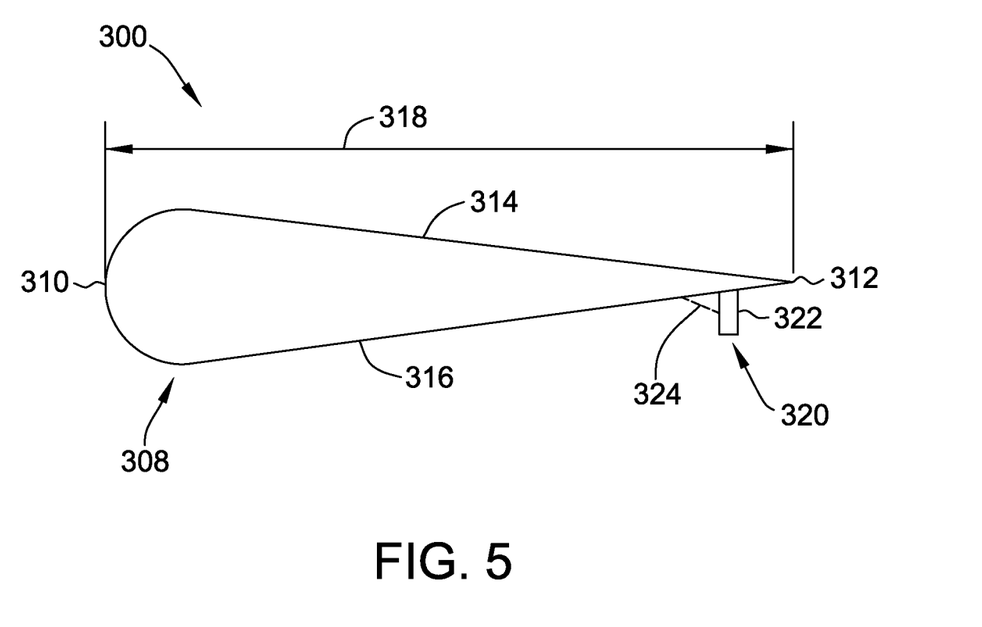
FIG. 5 is a sectional view of the strut shown in FIG. 4 taken along plane 5-5 of FIG. 4.

FIGS. 3 and 4 illustrate side and rear views, respectively, of an exemplary strut 300 that may be used in diffuser 200, and FIG. 5 is a sectional view of strut 300. Strut 300 is shaped to facilitate creating less disruptions in the flow of combustion gases through diffuser 200, and thus facilitates increasing the static pressure recovery capability of diffuser 200 and the overall operating efficiency of gas turbine 100. In the exemplary embodiment, strut 300 extends from a root 302 to a tip 304 along a span 306, and is formed with a substantially airfoil-shaped skin 308 that defines a leading edge 310, a trailing edge 312, a suction side 314, and a pressure side 316. As such, strut 300 has a chord 318 extending from leading edge 310 to trailing edge 312. In other embodiments, strut 300 may have any other suitable shape that enables strut 300 to function as described herein. Additionally, although chord 318 continuously lengthens from root 302 to tip 304 along span 306 in the exemplary embodiment, chord 318 may vary in length in any other suitable manner in other embodiments. For example, in some embodiments, chord 318 may decrease in length, or remain substantially constant in length, from root 302 to tip 304.

In the exemplary embodiment, strut 300 also includes a flap 320 on pressure side 316 near trailing edge 312. In one embodiment, flap 320 may be formed separately from, and coupled to, skin 308 and/or a suitable support structure beneath skin 308 in a manner that enables flap 320 to project from or through skin 308 (e.g., flap 320 may be welded to skin 308 and/or a suitable support structure beneath skin 308 in some embodiments). In another embodiment, flap 320 may be formed integrally with skin 308 and/or a suitable support structure beneath skin 308. In the exemplary embodiment, flap 320 includes a first plate 322 that is oriented substantially perpendicular to chord 318. Optionally, in some embodiments, flap 320 may also include a second plate 324 coupled to first plate 322 such that second plate 324 faces towards leading edge 310 to facilitate supporting first plate 322 in its orientation relative to chord 318 (e.g., second plate 324 may be coupled to first plate 322 such that first plate 322, second plate 324, and skin 308 collectively define a generally triangular shape). Alternatively, flap 320 may have any suitable structural configuration that enables flap 320 to function as described herein.

Figure 6:
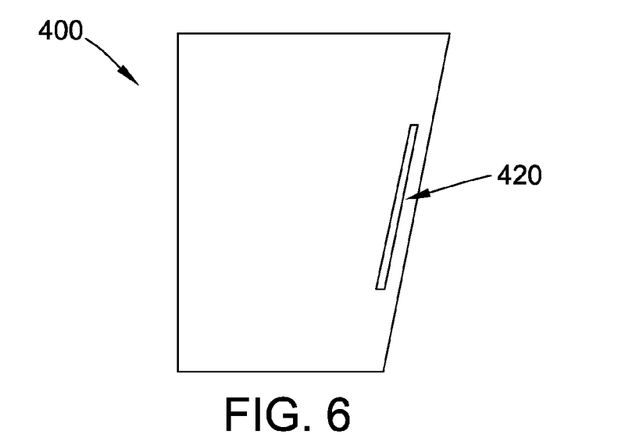
FIG. 6 is a side view of another exemplary strut for use in the diffuser shown in FIG. 2.
Figure 7:
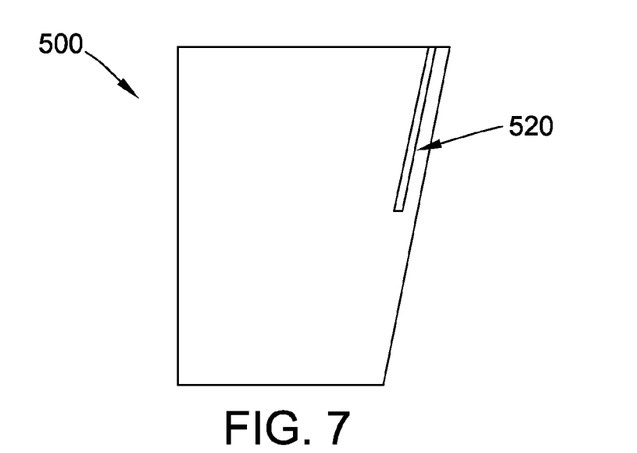
FIG. 7 is a side view of yet another exemplary strut for use in the diffuser shown in FIG. 2.
Figure 8:
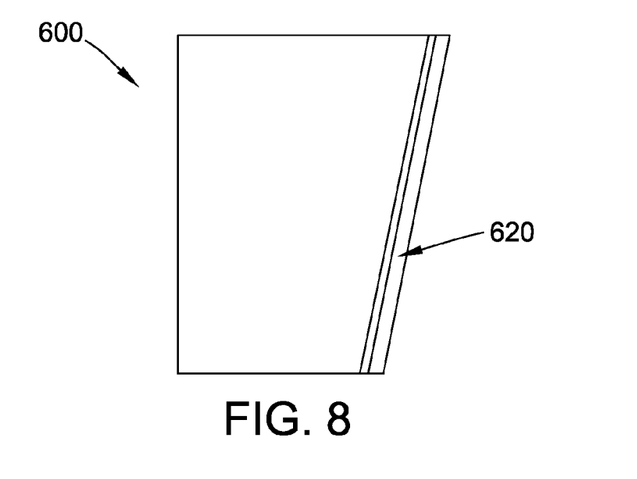
FIG. 8 is a side view of yet another exemplary strut for use in the diffuser shown in FIG. 2.

In terms of the location of flap 320 relative to chord 318 in the exemplary embodiment, flap 320 is spaced from trailing edge 312 by about 1.5% to about 3.5% of chord 318 (e.g., by about 2% of chord 318 in one embodiment). Alternatively, flap 320 may be located at any suitable location along chord 318. In terms of the extension of flap 320 along span 306, flap 320 extends along less than the entire span 306 (e.g., along about half of span 306) in some embodiments. In the exemplary embodiment (shown in FIGS. 3 and 4), flap 320 extends along an inner segment of span 306 (i.e., from root 302 to a location at about 50% of span 306 from root 302). In another embodiment (shown in FIG. 6), a strut 400 may have a flap 420 that extends along a middle segment of the span (i.e., from a location at about 25% of the span to a location at about 75% of the span). In yet another embodiment (shown in FIG. 7), a strut 500 may have a flap 520 that extends along an outer segment of the span (i.e., from a location at about 50% of the span to the tip of strut 500). In yet another embodiment (shown in FIG. 8), a strut 600 may have a flap 620 that extends along the entire span (i.e., along 100% of the span of strut 600, from the root to the tip). With exception to the spanwise extension of flaps 420, 520, and 620, struts 400, 500, and 600 (and flaps 420, 520, and 620) are configured in the same manner as strut 300 (and flap 320) set forth above. Alternatively, diffuser 200 may have a strut with a flap extending along any suitable span segment that facilitates enabling the strut to function as described herein (e.g., the flap may extend along less than half of the span in alternative embodiments).

In the exemplary embodiment, first plate 322 is a static (i.e., immovable or non-retractable) structure having a length 326 and a width 328 that is substantially constant (i.e., does not vary) along length 326. In other words, first plate 322 has a substantially rectangular profile in the exemplary embodiment. In one embodiment, width 328 is sized such that first plate 322 extends about 0.5 inches from skin 308. In another embodiment, width 328 may vary along length 326. For example, in some embodiments, length 326 may be sized to enable flap 320 to extend almost the entire span 306, with width 328 remaining substantially constant along a first segment of span 306, and tapering along a second segment of span 306 toward tip 304. Alternatively, flap 320 may be selectively adjustable (e.g., retractable) such that the distance that flap 320 projects from skin 308 (in terms of length 326 and/or width 328) can be varied during operation of gas turbine 100.

During operation of gas turbine 100 in partial load conditions, the swirl angle of combustion gases discharged from turbine 106 may increase by up to 40° in some instances. In that regard, it is desirable to facilitate minimizing any associated flow separation past struts 300, 400, 500, and 600 of diffuser 200 because such flow separation and increased swirl may reduce diffuser static pressure recovery by about 50 points (or approximately 5 MW), for example. Using flaps 320, 420, 520, and 620 facilitates controlling the circulation and reducing the swirl of the combustion gases in diffuser 200, which in turn facilitates reducing the flow separation in diffuser 200. In the manner set forth herein, flaps 320, 420, 520, and 620 may be placed (if non-retractable) or activated (if retractable) such that flaps 320, 420, 520, and 620 improve diffuser static pressure recovery when the turbine exit absolute swirl angle is between about 20° to about 60° (e.g., when gas turbine 100 is operating between about 40% of rated load and about 70% of rated load). In some instances, for example, flaps 320, 420, 520, and 620 may yield a net gain of about 7 points in diffuser recovery at about 60% load, wherein the benefit is about a +1.0 MW gain at about 60% load with substantially no losses at base load operation. Such a benefit is appreciated considering that every 10 points corresponds to a 0.1 change in the diffuser static pressure recovery coefficient (Cp).

The methods and systems described herein provide a diffuser having at least one strut with a flap that turns (or de-swirls) combustion gas discharged from a turbine in partial load operating conditions. As such, the methods and systems described herein facilitate reducing flow separation over the struts of the diffuser, and this facilitates reducing flow migration from the root to the tip of each strut. Thus, the methods and systems described herein facilitate optimizing the static pressure recovery capability of a gas turbine diffuser and, therefore, increasing the operating efficiency of the gas turbine.

Exemplary embodiments of a gas turbine diffuser and methods of assembling the same are described above in detail. The methods and systems described herein are not limited to the specific embodiments described herein, but rather, components of the methods and systems may be utilized independently and separately from other components described herein. For example, the methods and systems described herein may have other applications not limited to practice with gas turbine power systems, as described herein. Rather, the methods and systems described herein can be implemented and utilized in connection with various other industries.

While the invention has been described in terms of various specific embodiments, those skilled in the art will recognize that the invention can be practiced with modification within the spirit and scope of the claims.

What is claimed is:

1. A gas turbine diffuser for use with a gas turbine power system, said gas turbine diffuser comprising:
an annular inner wall;
an annular outer wall circumscribing said annular inner wall such that a gas path is defined between said annular inner and annular outer walls; and
a plurality of circumferentially-spaced struts extending from said annular inner wall to said annular outer wall across the gas path, wherein at least one of said plurality of circumferentially-spaced struts comprises:
a root, a tip, and a span extending from said root to said tip;
a leading edge;
a trailing edge;
a pressure side extending from said leading edge downstream to said trailing edge; and
a flap immovably coupled along said pressure side, near and upstream from said trailing edge, said flap extending circumferentially from a first end coupled to said pressure side to a free end, wherein said flap extends along at least half of the respective span of said at least one of said plurality of circumferentially-spaced struts, and said flap is oriented parallel to said trailing edge.

2. A gas turbine diffuser in accordance with claim 1, wherein said at least one of said plurality of circumferentially-spaced struts comprises a substantially airfoil-shaped skin that defines said leading edge, said trailing edge, a suction side, and said pressure side.

3. A gas turbine diffuser in accordance with claim 2, wherein said at least one of said plurality of circumferentially-spaced struts has a chord extending from said leading edge to said trailing edge, said flap disposed at between 1.5% and 3.5% of the chord upstream from said trailing edge.

4. A gas turbine diffuser in accordance with claim 2, wherein said at least one of said plurality of circumferentially-spaced struts has a chord extending in an axial direction from said leading edge to said trailing edge, said flap comprising a first plate oriented substantially perpendicular to the axial direction.

5. A gas turbine diffuser in accordance with claim 4, wherein said flap comprises a second plate coupled to said first plate such that said flap forms a generally triangular shape defined by said first plate, said second plate, and said substantially airfoil-shaped skin.

6. A gas turbine diffuser in accordance with claim 1, wherein said flap extends from 0 percent of the span to 50 percent of the span.

7. A gas turbine diffuser in accordance with claim 1, wherein said flap extends from 25 percent of the span to 75 percent of the span.

8. A gas turbine diffuser in accordance with claim 1, wherein said flap extends from said root to said tip along the span.

9. A gas turbine diffuser in accordance with claim 1, wherein said flap extends from 50 percent of the span to 100 percent of the span.

10. A gas turbine comprising:
a combustor;
a turbine arranged in flow communication with said combustor; and
a diffuser arranged in flow communication with said turbine, said diffuser comprising:
an annular inner wall;
an annular outer wall circumscribing said annular inner wall such that a gas path is defined between said annular inner and annular outer walls; and
a plurality of circumferentially-spaced struts extending from said annular inner wall to said annular outer wall across the gas path, wherein at least one of said plurality of circumferentially-spaced struts comprises:
a root, a tip, and a span extending from said root to said tip;
a leading edge;
a trailing edge, wherein a chord of said at least one of said plurality of circumferentially-spaced struts extends in an axial direction from said leading edge to said trailing edge;
a pressure side extending from said leading edge downstream to said trailing edge; and
a flap immovably coupled along said pressure side and oriented substantially perpendicular to the axial direction, said flap extending circumferentially from a first end coupled to said pressure side to a free end, wherein said flap extends along at least half of the respective span of said at least one of said plurality of circumferentially-spaced struts, and said flap is oriented parallel to said trailing edge.

11. A gas turbine in accordance with claim 10, wherein said at least one of said plurality of circumferentially-spaced struts comprises a substantially airfoil-shaped skin that defines said leading edge, said trailing edge, a suction side, and said pressure side, said flap coupled along said pressure side between 1.5% and 3.5% of the chord from said trailing edge.

12. A gas turbine in accordance with claim 10, wherein said flap extends from said root to said tip along the span.

13. A gas turbine in accordance with claim 10, wherein said flap extends from 0 percent of the span to 50 percent of the span.

14. A gas turbine diffuser in accordance with claim 10, wherein said flap extends from 25 percent of the span to 75 percent of the span.

15. A gas turbine diffuser in accordance with claim 10, wherein said flap extends from 50 percent of the span to 100 percent of the span.

16. A gas turbine diffuser for use with a gas turbine power system, said gas turbine diffuser comprising:
   an annular inner wall;
   an annular outer wall circumscribing said annular inner wall such that a gas path is defined between said annular inner and annular outer walls; and
   a plurality of circumferentially-spaced struts extending from said annular inner wall to said annular outer wall across the gas path, wherein at least one of said plurality of circumferentially-spaced struts comprises:
   a root, a tip, and a span extending from said root to said tip;
   a leading edge;
   a trailing edge;
   a pressure side extending from said leading edge downstream to said trailing edge; and
   a flap immovably coupled along said pressure side, near and upstream from said trailing edge, said flap extending circumferentially from a first end coupled to said pressure side to a free end, wherein said flap extends along at least half of the respective span of said at least one of said plurality of circumferentially-spaced struts, wherein said flap is oriented at an angle to a spanwise direction of said at least one of said plurality of circumferentially-spaced struts, and said flap is oriented parallel to said trailing edge.

17. A gas turbine diffuser in accordance with claim 16, wherein said at least one of said plurality of circumferentially-spaced struts comprises a substantially airfoil-shaped skin that defines said leading edge, said trailing edge, a suction side, and said pressure side.

18. A gas turbine diffuser in accordance with claim 17, wherein said at least one of said plurality of circumferentially-spaced struts has a chord extending from said leading edge to said trailing edge, said flap disposed at between 1.5% and 3.5% of the chord upstream from said trailing edge.

19. A gas turbine diffuser in accordance with claim 17, wherein said at least one of said plurality of circumferentially-spaced struts has a chord extending in an axial direction from said leading edge to said trailing edge, said flap comprising a first plate oriented substantially perpendicular to the axial direction.

20. A gas turbine diffuser in accordance with claim 19, wherein said flap comprises a second plate coupled to said first plate such that said flap forms a generally triangular shape defined by said first plate, said second plate, and said substantially airfoil-shaped skin.

* * * * *